United States Patent
Cho

(10) Patent No.: US 7,603,134 B2
(45) Date of Patent: Oct. 13, 2009

(54) POWER CONTROL METHOD FOR A MOBILE COMMUNICATION SYSTEM

(75) Inventor: Tae-Hyun Cho, Incheon (KR)

(73) Assignee: LG Electronics Inc., Seoul (KR)

( * ) Notice: Subject to any disclaimer, the term of this patent is extended or adjusted under 35 U.S.C. 154(b) by 823 days.

(21) Appl. No.: 10/885,682

(22) Filed: Jul. 8, 2004

(65) Prior Publication Data

US 2005/0009553 A1  Jan. 13, 2005

(30) Foreign Application Priority Data

Jul. 12, 2003  (KR) ...................... 10-2003-0047526

(51) Int. Cl.
*H04B 7/00* (2006.01)
*H04Q 7/20* (2006.01)

(52) U.S. Cl. ...................... 455/522; 455/69; 455/127.1; 455/13.4

(58) Field of Classification Search ................. 455/522, 455/69, 67.11, 442, 13.4, 63.1, 127.1, 70, 455/517, 126, 67.13, 88, 115.1; 370/318, 370/332, 335, 338, 311, 252, 470
See application file for complete search history.

(56) References Cited

U.S. PATENT DOCUMENTS

| | | | |
|---|---|---|---|
| 5,603,096 A | 2/1997 | Gilhousen et al. ............. | 455/69 |
| 6,151,508 A * | 11/2000 | Kim et al. .................... | 455/522 |
| 6,490,460 B1 | 12/2002 | Soliman ...................... | 455/522 |
| 6,529,482 B1 | 3/2003 | Lundby ....................... | 370/252 |
| 6,571,104 B1 * | 5/2003 | Nanda et al. ................. | 455/522 |
| 6,584,087 B1 * | 6/2003 | Czaja et al. .................. | 370/335 |
| 6,829,468 B2 * | 12/2004 | Gandhi et al. ................. | 455/69 |
| 6,912,213 B2 * | 6/2005 | Kim ........................... | 370/338 |
| 2001/0033558 A1* | 10/2001 | Matsuki ....................... | 370/335 |
| 2003/0058821 A1* | 3/2003 | Lee et al. ..................... | 370/335 |
| 2003/0179727 A1* | 9/2003 | Soong et al. ................. | 370/328 |

FOREIGN PATENT DOCUMENTS

| | | |
|---|---|---|
| EP | 1083678 A1 | 3/2001 |
| KR | 1020000019789 | 4/2000 |
| KR | 1020020078064 | 10/2002 |

\* cited by examiner

*Primary Examiner*—John J Lee
(74) *Attorney, Agent, or Firm*—Ked & Associates LLP

(57) ABSTRACT

A power control method for a mobile communication system includes determining a signal quality of a backward channel between a base station and mobile terminal and then transmitting a power control signal to a terminal to temporarily suspend backward power control of the terminal if the signal quality is stable. When the signal quality is maintained at a stable level, subsequent power control signals including information and/or data are transmitted to the terminal. As a result, transmission efficiency is improved and unnecessary backward power controlling is prevented.

43 Claims, 2 Drawing Sheets

POWER CONTROL METHOD FOR A MOBILE COMMUNICATION SYSTEM

BACKGROUND OF THE INVENTION

1. Field of the Invention

The present invention generally relates to mobile communication systems, and more particularly to a system and method of controlling power of one or more mobile terminals.

2. Description of the Related Art

In a mobile communication system, power control is often used to enhance performance and minimize transmission error. In such a system, an attempt is made to adjust the transmission power of mobile terminals to be uniform. In order to accomplish this, the mobile communication system sends radio waves of low power to terminals close to a base station and radio waves of high power to terminals farther away from the base station.

The process of using a base station to adjust transmission power of a mobile terminal is called backward power controlling. During this process, the base station measures the signal-to-noise ratio of a signal received from the terminal and continuously controls backward power.

In a related-art system, the length of a frame transferred to the base station through a backward traffic channel is typically 20 ms and a power control period of the base station is usually 1.24 ms. With this frame and period, the base station is able to perform backward power control 16 times. Each time interval during which backward power control is performed may be referred to as a power control group (PCG).

The related-art backward power control method as performed by the base station will now be described. When frames of a terminal arrive, the base station measures the signal-to-noise ratio (referred to as 'PCG_(Eb/No)') of each PCG, and compares the measured PCG_(Eb/No) with a preset reference Eb/No. If the PCG_(Eb/No) is smaller than the reference Eb/No, the base station increases backward power (transmission power of the terminal). However, if the PCG_(Eb/No) is greater than the reference Eb/No, the base station generates a power control signal for reducing backward power and transmits this signal to the terminal. Then, the terminal increases or decreases its transmission power with reference to the power control signal.

The power control signal has a total size of 6 bits, including 4 bits for power control position designation and 2 bits for power controlling. If the power control bits are '00,' the terminal decreases its transmission power to achieve a prescribed strength. If the power control bits are '11,' the terminal increases its transmission power to achieve a prescribed strength.

Backward power control is continuously performed while the terminal transmits signals. However, the related art power control method has at least the following problem. Because the base station transmits a power control signal to the terminal even in a situation where signal quality of a backward channel is stably maintained (e.g., in a situation where power control is not necessary), the opportunity or availability of transmitting data information (such as a voice signal) at least at a desired rate is limited. As a result, transmission efficiency of the backward channel is substantially degraded.

SUMMARY OF THE INVENTION

An object of the present invention is to solve one or more problems of the related art and/or to achieve at least one of the following advantages.

Another object of the present invention is to provide a power control method for a mobile communication system which limits transmission of a power control signal while signal quality of a backward channel is maintained a predetermined level, which, for example, may correspond to a stable level.

To achieve these and other objects and advantages in whole or part, the present invention provides a power control method of a mobile communication base station, including: determining signal quality of a backward channel; and transmitting a power control signal to a terminal to temporarily suspend backward power controlling if the signal quality is stable. The power control signal preferably contains a data signal, not a signal for controlling increase/decrease of transmission power.

The base station maintains backward power at a current level while power controlling is suspended. Also, the base station determines that signal quality is stable when a difference value between a signal quality measured value of a current period and a signal quality measured value of a previous period does not exceed a threshold value during the certain number of frame intervals. The base station may resume backward power controlling if the signal quality measured value is out of a stable signal range for certain number of times consecutively. Preferably, the signal quality is related to a signal-to-noise ratio (Eb/No).

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DETAILED DESCRIPTION OF THE PREFERRED EMBODIMENTS

When a backward channel environment satisfies both conditions 1 and 2 below, a base station regards signal quality of a backward channel as maintaining a stable level and suspends control of terminal transmission power. More specifically, the base station does not transmit power control bits to the terminal until a third condition occurs. When condition 3 occurs, the base station resumes control of transmission power of the terminal.

Condition 1. A difference value (Δ) between a current PCG_(Eb/No) and a previous PCG_(Eb/No) is not greater than a certain threshold value, e.g., there is little change in PCG_(Eb/No).

Condition 2. Condition 1 is maintained during a predetermined number of frame intervals (referred to as 'averframes interval'). The number of frames constituting the averframes interval may differ depending, for example on the type of communications network and also may be determined by a service provider.

Condition 3. PCG_(Eb/No) lies outside of a certain stable signal range for three times consecutively.

Figure 1:
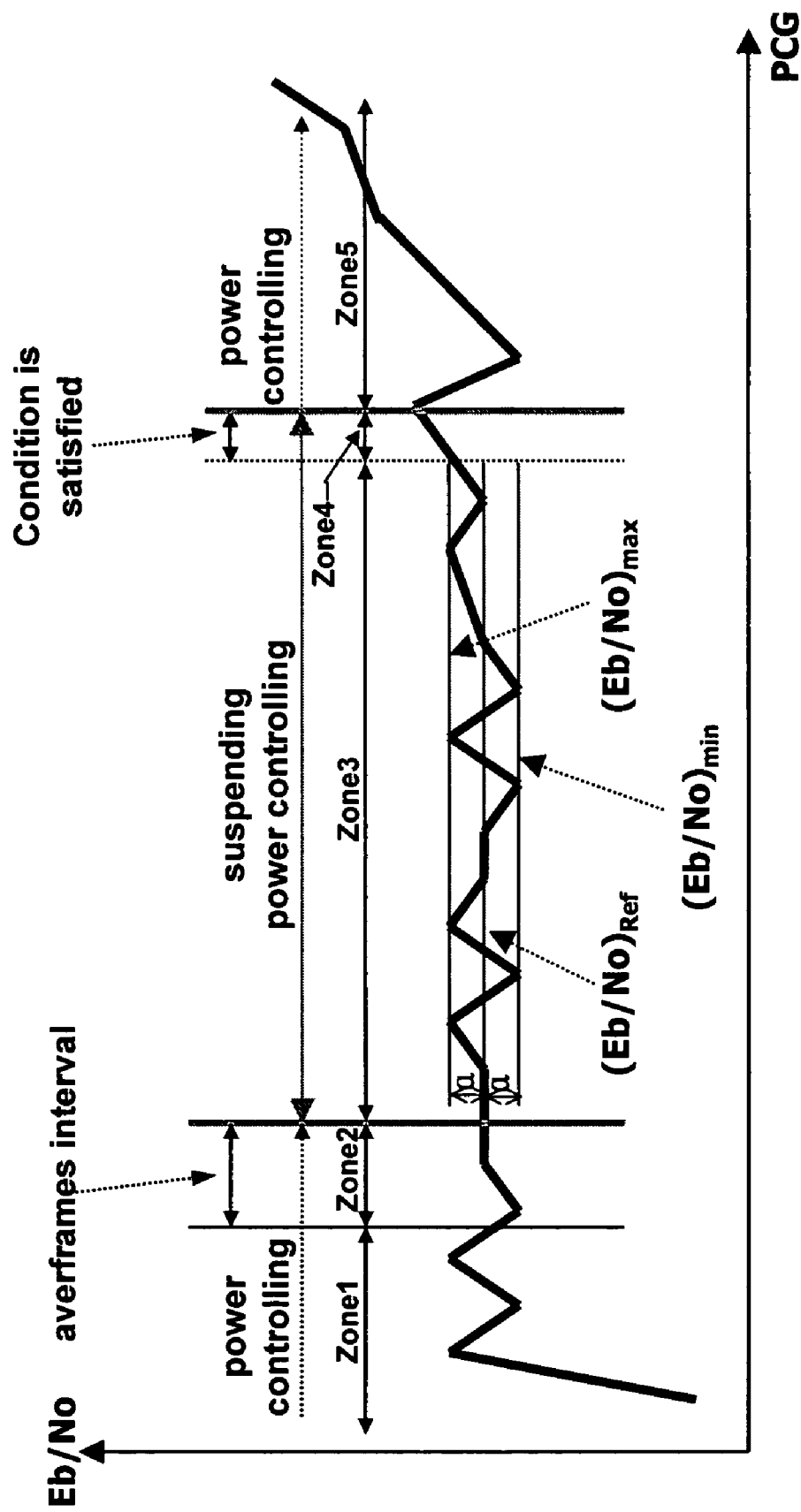
FIG. 1 is a graph showing a relationship between a PCG_(Eb/No) and backward power in accordance with a preferred embodiment of the present invention.

Operation of the base station and terminal in accordance with a preferred embodiment of the present invention will now be described with reference to FIG. 1. While the base station receives frames from the terminal, the base station measures signal quality of a backward channel, namely, PCG_(Eb/No), at certain time intervals (e.g., 1.25 ms) and performs power control according to another method, e.g., the related-art method previously described. In the meantime, the base station also observes a change in PCG_(Eb/No). (Zone 1).

When a backward channel environment satisfies conditions 1 and 2, the base station determines that the backward channel is in a stable state. (Zone 2). The base station obtains an average value $((Eb/No)_{ref})$ of every PCG_(Eb/No) measured during the averframes interval and sets a stable signal range, e.g., $(Eb/No)_{min}$–$(Eb/No)_{max}$. The maximum value $(Eb/No)_{max}$ of this range is $(Eb/No)_{ref}+\alpha$ and a minimum value $(Eb/No)_{min}$ is $(Eb/No)_{ref}-\alpha$. The value of $\alpha$ is a predetermined value which may be selected arbitrarily or based on some desired level of performance of the communication system.

The base station then transmits a power control signal indicating temporary suspension of power controlling (e.g., a power control signal with power control position designation bits set as '0000' and power control bits set as '10') to the terminal. (Zone 3). Power control signals transmitted after the power control signal ('0000'+'10') contain information data (e.g., voice data) instead of power control bits.

Thereafter, if condition 3 occurs, the base station releases the declared 'stable state' and transmits a power control signal including power control position designation bits set as '0000' and normal power control bits ('11' or '00') to the terminal. (Zone 4).

Upon receiving the power control signal including the power control position designation bits set as '0000' and the power control bits set as '10', the terminal processes the power control bits (2 bits) of the power control signal received after the power control signal ('0000'+'10') as information data and maintains transmission power at a current level. Such processing of the terminal is kept until a power control signal having the power control position designation bits of '0000' is received.

When the power control signal having the power control position designation bits of '0000' is received, the terminal normally increases or decreases its transmission power with reference to the power control bits of the received power control signal. (Zone 5).

Figure 2:
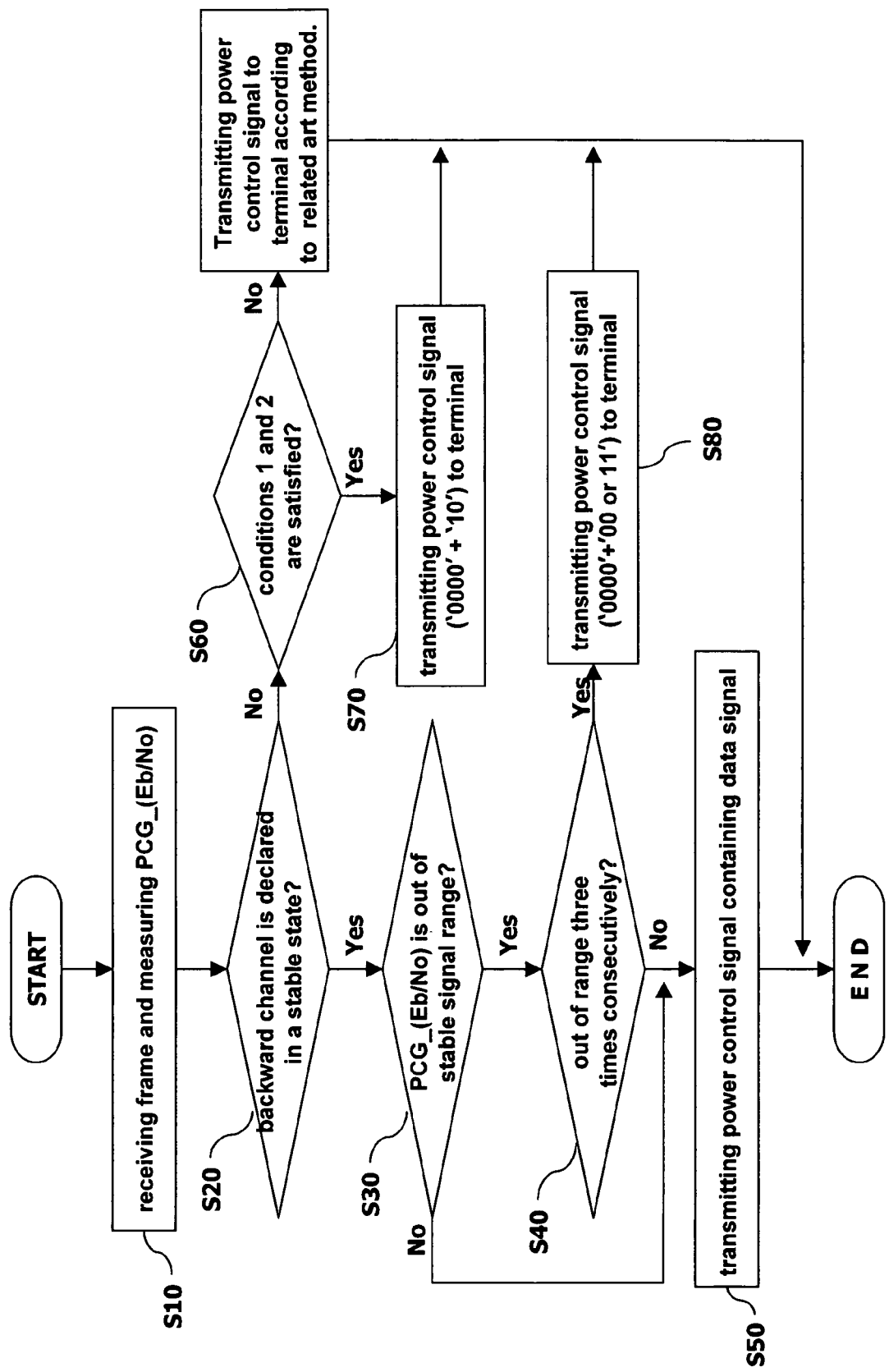
FIG. 2 is a flow chart showing steps included in a power control method in accordance with the preferred embodiment of the present invention.

The power control method in accordance with the preferred embodiment of the present invention will now be described with reference to FIG. 2. When frames arrive from the terminal, the base station checks a state of the backward channel while measuring PCG_(Eb/No) (steps S10 and S20). At this time, if the backward channel is declared to be in a stable state, the base station checks whether a value of PCG_(Eb/No) comes within a range (e.g., $(Eb/No)_{min}$–$(Eb/No)_{max}$)) (Step S30), and transmits a power control signal having only the power control position designation bits to the terminal (step 550).

If it is determined that the value of PCG_(Eb/No) has been out of the stable signal range three times consecutively, the base station transmits a power control signal having power control position designation bits set as '0000' and power control bits set as '11' (or '00') (Steps S40 and S80).

However, if the backward channel is not determined to be in a stable state, the base station checks whether the backward channel environment satisfies both conditions 1 and 2 (Step S60). If the backward channel environment satisfies conditions 1 and 2, the base station transmits a signal having power control position designation bits set as '0000' and power control bits set as '10' to the terminal (Step S70).

The terminal checks the power control signal received from the base station. If the power control position designation bits of the signal are '0000' and the power control bits are '10,' the terminal maintains its transmission power at the current level. While the transmission power is maintained at the current level, if the terminal receives a different power control signal having power control position designation bits of '0000,' the terminal increases or decreases its transmission power with reference to the power control bits ('00' or '11') contained in the power control signal.

The power control method in accordance with the present invention therefore has at least the following advantages. When signal quality of the backward channel maintains a stable level, a portion of the power control signal of the base station transmitted to the terminal is substituted by a data signal. As a result, unnecessary backward power controlling is prevented and transmission efficiency of the backward channel is substantially enhanced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A power control method in a mobile communication system, comprising:
    determining a quality of a signal transmitted from a mobile terminal on a reverse channel; and
    transmitting a power control signal to the mobile terminal in order to suspend reverse power control of the terminal if the signal quality lies within a predetermined range, wherein no power control signals to control power are transmitted to the mobile terminal while the signal quality of the mobile terminal lies within the predetermined range when reverse power control of the mobile terminal is suspended, or while the signal quality of the mobile terminal does not deviate from the predetermined range more than a certain number of times when reverse power control of the mobile terminal is suspended.

2. The method of claim 1, wherein the predetermined range lies between two predetermined signal-to-noise ratio values.

3. The method of claim 2, wherein the predetermined range corresponds to a stable signal quality range.

4. The method of claim 1, further comprising:
    transmitting a number of additional signals to the mobile terminal before a condition is satisfied, wherein the additional signals are transmitted at a time when power control signals would have been transmitted to the mobile terminal before suspension of the reverse power control, and wherein the additional power control signals do not contain a signal for controlling increase/decrease of terminal transmission power.

5. The method of claim 4, wherein the number of additional signals is greater than one.

6. The method of claim 4, wherein the additional signals contain data.

7. The method of claim 4, wherein the condition corresponds to detecting that at least a portion of the additional signals have signal qualities that lie outside of the predetermined range a number of times.

8. The method of claim 7, wherein the number of times is three.

9. The method of claim 1, wherein the base station maintains reverse power at a current level while power control is suspended.

10. The method of claim 1, wherein the signal quality is based on a signal-to-noise ratio (Eb/No).

11. The method of claim 1, wherein the reverse channel is between a base station and the mobile terminal.

12. The method of claim 11, wherein the base station determines the quality of the signal from and transmits the power control signal to the mobile terminal.

13. The method of claim 1, wherein the mobile terminal maintains a power level that previously existed before or at an initial time point when reverse power control of the mobile terminal was suspended.

14. The method of claim 13, further comprising:
transmitting data to the mobile terminal during a time when reverse power control of the mobile terminal is suspended, the data transmitted during a time period allocated to transmitting a power control signal to the mobile terminal when reverse power control of the mobile terminal is not suspended.

15. A power control method in a mobile communication system, comprising:
determining a quality of a signal transmitted from a mobile terminal on a reverse channel; and
transmitting a power control signal to the mobile terminal in order to suspend reverse power control of the terminal if the signal quality lies within a predetermined range, wherein a base station determines that the signal quality lies within the predetermined range when a difference value between a measured signal quality value of a current period and a measured signal quality value of a previous period does not exceed a threshold value during a certain number of frame intervals.

16. The method of claim 15, wherein the period is a time interval between power control groups.

17. The method of claim 15, wherein the measured signal quality value is based on a signal-to-noise ratio (Eb/No).

18. The method of claim 15, wherein the base station resumes reverse power control of the terminal if the signal quality deviates from the predetermined range for certain number of times consecutively.

19. The method of claim 18, wherein the range is based on an average signal quality value measured during a predetermined number of frame intervals.

20. An apparatus in a mobile communication system, comprising:
a detector which detects quality of a signal transmitted on a reverse channel from a mobile terminal; and
a transmitter which transmits a power control signal to the mobile terminal in order to suspend reverse power control of the terminal if the signal quality lies within a predetermined range, wherein the transmitter transmits no power control signals to the mobile terminal to control power while the signal quality of the mobile terminal lies within the predetermined range when reverse power control of the mobile terminal is suspended, or while the signal quality of the mobile terminal does not deviate from the predetermined range more than a certain number of times when reverse power control of the mobile terminal is suspended.

21. The apparatus of claim 20, wherein the predetermined range lies between two predetermined signal-to-noise ratio values.

22. The apparatus of claim 21, wherein the predetermined range corresponds to a stable signal quality range.

23. The apparatus of claim 20, wherein the transmitter transmits a number of additional signals to the mobile terminal before a condition is satisfied, wherein the additional signals are transmitted at a time when power control signals would have been transmitted to the mobile terminal suspension of the reverse power control, and wherein the additional power control signals do not contain a signal for controlling increase/decrease of terminal transmission power.

24. The apparatus of claim 23, wherein the number of additional signals is greater than one.

25. The apparatus of claim 23, wherein the additional signals contain data.

26. The apparatus of claim 23, wherein the condition corresponds to detecting that at least a portion of the additional signals have signal qualities that lie outside of the predetermined range a number of times.

27. The apparatus of claim 26, wherein the number of times is three.

28. The apparatus of claim 20, wherein the current period and previous period correspond to a time interval between power control groups.

29. The apparatus of claim 20, wherein the signal quality value is based on a signal-to-noise ratio (Eb/No).

30. The apparatus of claim 20, wherein the transmitter transmits another power control signal to the mobile terminal to resume reverse power control of the terminal if the signal quality deviates from the predetermined range for certain number of times consecutively.

31. The apparatus of claim 30, wherein the range is based on an average signal quality value measured during a predetermined number of frame intervals.

32. The apparatus of claim 20, wherein the apparatus is a base station.

33. The apparatus of claim 20, wherein the mobile terminal maintains a power level that previously existed before or at an initial time point when reverse power control of the mobile terminal was suspended.

34. The apparatus of claim 33, wherein the transmitter transmits data to the mobile terminal during a time when reverse power control of the mobile terminal is suspended, the data transmitted during a time period allocated to transmitting a power control signal to the mobile terminal when reverse power control of the mobile terminal is not suspended.

35. An apparatus in a mobile communication system, comprising:
a detector which detects quality of a signal transmitted on a reverse channel from a mobile terminal; and
a transmitter which transmits a power control signal to the mobile terminal in order to suspend reverse power control of the terminal if the signal quality lies within a predetermined range, wherein the detector determines that the signal quality lies within the predetermined range when a difference value between a measured signal quality value of a current period and a measured signal quality value of a previous period does not exceed a threshold value during a certain number of frame intervals.

36. A method, comprising:
forming a power control signal; and
transmitting the power control signal to a mobile terminal through a reverse channel between the terminal and a base station, the power control signal to suspend reverse power control of the terminal if a quality of a signal transmitted from the mobile terminal lies within a predetermined range, wherein no power control signals are transmitted to the mobile terminal to control power while the signal quality of the mobile terminal lies within the predetermined range when reverse power control of the mobile terminal is suspended, or while the signal quality of the mobile terminal does not deviate from the predetermined range more than a certain number of times when reverse power control of the mobile terminal is suspended.

37. A mobile communication system, comprising:
at least one mobile terminal; and
a control unit which detects a quality of a signal transmitted on a reverse channel from the mobile terminal and transmits a power control signal to the mobile terminal in order to suspend reverse power control of the terminal if the signal quality lies within a predetermined range, wherein the control unit transmits no power control signals to the mobile terminal to control power while the signal quality of the mobile terminal lies within the predetermined range when reverse power control of the mobile terminal is suspended, or while the signal quality of the mobile terminal does not deviate from the predetermined range more than a certain number of times when reverse power control of the mobile terminal is suspended.

38. The system of claim 37, wherein the predetermined range lies between two predetermined signal-to-noise ratio values.

39. The system of claim 37, wherein the control unit transmits a number of additional power control signals to the mobile terminal before a condition is satisfied, wherein the additional power control signals do not contain a signal for controlling increase/decrease of terminal transmission power.

40. The system of claim 39, wherein the number of additional power control signals is greater than one.

41. The system of claim 39, wherein the additional power control signals contain data.

42. A method comprising:
forming a power control signal; and
transmitting the power control signal to a mobile terminal through a reverse channel between the terminal and a base station, the power control signal to suspend reverse power control of the terminal if a quality of a signal transmitted from the mobile terminal lies within a predetermined range, wherein the base station determines that the quality of the signal transmitted from the mobile terminal on the reverse channel lies within the predetermined range, the base station determining that the signal quality lies within the predetermined range when a difference value between a measured signal quality value of a current period and a measured signal quality value of a previous period does not exceed a threshold value during a certain number of frame intervals.

43. A mobile communication system comprising:
at least one mobile terminal; and
a control unit which detects a quality of a signal transmitted on a reverse channel from the mobile terminal and transmits a power control signal to the mobile terminal in order to suspend reverse power control of the terminal if the signal quality lies within a predetermined range, wherein a base station includes the control unit that determines that the signal quality of the reverse channel lies within the predetermined range, the control unit determining that the signal quality lies within the predetermined range when a difference value between a measured signal quality value of a current period and a measured signal quality value of a previous period does not exceed a threshold value during a certain number of frame intervals.

* * * * *